(12) United States Patent
Chen et al.

(10) Patent No.: US 11,416,775 B2
(45) Date of Patent: Aug. 16, 2022

(54) TRAINING ROBUST MACHINE LEARNING MODELS

(71) Applicant: International Business Machines Corporation, Armonk, NY (US)

(72) Inventors: Pin-yu Chen, White Plain, NY (US); Sijia Liu, Somerville, MA (US); Shiyu Chang, Elmsford, NY (US); Payel Das, Yorktown Heights, NY (US); Minhao Cheng, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 16/851,221

(22) Filed: Apr. 17, 2020

(65) Prior Publication Data

US 2021/0326745 A1    Oct. 21, 2021

(51) Int. Cl.
*G06N 20/00*    (2019.01)
*G06F 17/18*    (2006.01)

(52) U.S. Cl.
CPC ............. *G06N 20/00* (2019.01); *G06F 17/18* (2013.01)

(58) Field of Classification Search
CPC ......... G06N 20/00; G06N 7/005; G06F 17/18
See application file for complete search history.

(56) References Cited

U.S. PATENT DOCUMENTS

| | | | | |
|---|---|---|---|---|
| 11,182,620 B2* | 11/2021 | Weinzaepfel | ........ | G06N 3/0454 |
| 11,328,533 B1* | 5/2022 | Tadi | ...................... | G06V 40/168 |
| 2019/0244103 A1 | 8/2019 | Wang et al. | | |
| 2021/0304123 A1* | 9/2021 | Vanapalli | ............. | G06N 3/0454 |
| 2021/0319880 A1* | 10/2021 | Tomii | .................... | A61B 5/7264 |
| 2021/0355884 A1* | 11/2021 | Chae | .................. | F02N 11/0814 |
| 2022/0012895 A1* | 1/2022 | Wakui | .................... | G06V 20/69 |
| 2022/0030031 A1* | 1/2022 | Kocsis | .................. | H04L 9/3239 |
| 2022/0094943 A1* | 3/2022 | Suzuki | ................... | H04N 19/85 |

OTHER PUBLICATIONS

Aleksander Madry, Aleksandar Makelov, Ludwig Schmidt, Dimitris Tsipras, and Adrian Vladu. "Towards deep learning models resistant to adversarial attacks. International Conference on Learning Representations", arXiv:1706.06083v4 [stat.ML] Sep. 4, 2019.
Jianyu Wang. Bilateral adversarial training: Towards fast training of more robust models against adversarial attacks. International Conference on Computer Vision, trainarXiv: 1811.10716v2 [cs CV] Aug. 1, 2019.

(Continued)

*Primary Examiner* — Brian D Nguyen
(74) *Attorney, Agent, or Firm* — Patterson + Sheridan, LLP (57) ABSTRACT

Techniques for training robust machine learning models for adversarial input data. Training data for a machine learning (ML) model is received. The training data includes a plurality of labels for data elements. First modified training data is generated by modifying one or more of the plurality of labels in the training data using parameterized label smoothing with a first optimization parameter. The ML model is trained using the first modified training data. The training includes updating a first one or more model weights in the ML model, and generating a second optimization parameter suitable for use in future parameterized label smoothing for future training of the ML model

20 Claims, 8 Drawing Sheets

(56) References Cited

OTHER PUBLICATIONS

Hongyang Zhang, Yaodong Yu, Jiantao Jiao, Eric P Xing, Laurent El Ghaoui, and Michael I Jordan. Theoretically principled trade-off between robustness and accuracy. International Conference on Machine Learning, 2019.

Chen, Liu, Chang, Das, and Cheng, "SPROUT: Self-Progressing Robust Training," ICLR 2020, 15 pages, Sep. 25, 2019, ICLR 2020 Conference Submission (Grace Period Disclosure/Inventor Originated Disclosure).

Ali Shafahi, Amin Ghiasi, Furong Huang, and Tom Goldstein. Label smoothing and logit squeezing: A replacement for adversarial training, arXiv:1910.11585v1 [cs.LG] Oct. 25, 2019.

Hongyi Zhang, Moustapha Cisse, Yann N Dauphin, and David Lopez-Paz. mixup: Beyond empirical risk minimization. International Conference on Learning Representations, arXiv:1710.09412v2 [cs.LG] Apr. 27, 2018.

* cited by examiner

ORIGINAL TOP-3 INFERRED CAPTIONS:

1. A RED STOP SIGN SITTING ON THE SIDE OF A ROAD.
2. A STOP SIGN ON THE CORNER OF A STREET.
3. A RED STOP SIGN SITTING ON THE SIDE OF A STREET.

172

ADVERSARIAL TOP-3 CAPTIONS:

1. A BROWN TEDDY BEAR LAYING ON TOP OF A BED.
2. A BROWN TEDDY BEAR SITTING ON TOP OF A BED.
3. A LARGE BROWN TEDDY BEAR LAYING ON TOP OF A BED.

TRAINING ROBUST MACHINE LEARNING MODELS

STATEMENT REGARDING PRIOR DISCLOSURES BY THE INVENTOR OR A JOINT INVENTOR

The following disclosure(s) are submitted under 35 U.S.C. 102(b)(1)(A): "SPROUT: Self-Progressing Robust Training," Pin-Yu Chen, Sijia Liu, Shiyu Chang, Payel Das, Minhao Cheng, Sep. 25, 2019, ICLR 2020 Conference Submission.

BACKGROUND

The present invention relates to machine learning, and more specifically, in one or more embodiments, to training robust machine learning models for adversarial input data.

SUMMARY

Embodiments include a method. The method includes receiving training data for a machine learning (ML) model, the training data including a plurality of labels for data elements. The method further includes generating first modified training data by modifying one or more of the plurality of labels in the training data using parameterized label smoothing with a first optimization parameter. The method further includes training the ML model using the first modified training data, the training including updating a first one or more model weights in the ML model and generating a second optimization parameter, the second optimization parameter suitable for use in future parameterized label smoothing for future training of the ML model.

Embodiments further include a system. The system includes a processor and a memory storing a program, which, when executed on the processor, performs an operation. The operation includes receiving training data for a machine learning (ML) model, the training data including a plurality of labels for data elements. The operation further includes generating first modified training data by modifying one or more of the plurality of labels in the training data using parameterized label smoothing with a first optimization parameter. The operation further includes training the ML model using the first modified training data, the training including updating a first one or more model weights in the ML model and generating a second optimization parameter, the second optimization parameter suitable for use in future parameterized label smoothing for future training of the ML model.

Embodiments further include a non-transitory computer program product, the computer program product including a computer-readable storage medium having computer-readable program code embodied therewith, the computer-readable program code executable by one or more computer processors to perform an operation. The operation includes receiving training data for a machine learning (ML) model, the training data including a plurality of labels for data elements. The operation further includes generating first modified training data by modifying one or more of the plurality of labels in the training data using parameterized label smoothing with a first optimization parameter. The operation further includes training the ML model using the first modified training data, the training including updating a first one or more model weights in the ML model and generating a second optimization parameter, the second optimization parameter suitable for use in future parameterized label smoothing for future training of the ML model.

DETAILED DESCRIPTION

While deep neural networks (DNNs) have achieved significant success on a variety of datasets and across domains, developing better training algorithms that are capable of strengthening model robustness is becoming increasingly important for creating trustworthy and reliable machine learning systems. For example, DNNs trained by standard algorithms (e.g., natural models) may be vulnerable to adversarial input perturbations. Adversarial examples crafted to include designed input perturbations can cause erroneous decision making for machine learning algorithms trained using standard techniques. This has intensified the demand for robust training methods.

Recent robust training algorithms are typically based on the methodology of adversarial training, which calls specific attacking algorithms to generate adversarial examples during model training for teaching robust models. These techniques can be effective, but they often provide very poor scalability because the process of generating adversarial examples to use during training incurs considerable computation overhead. For example, depending on the circumstances, standard adversarial training (e.g., using 7 attack iterations per sample in every mini-batch) can consume ten times more clock time per training epoch when compared with standard training.

Commonly used adversarial training techniques can also suffer from attack specificity. Models that are adversarially trained using these techniques are usually most effective against the same attack they trained on, and the robustness may not generalize well to other types of attacks. Further, known adversarial training techniques are more effective when the networks have sufficient capacity (e.g., having more neurons in network layers).

One or more embodiments described herein relate to techniques for a new robust training method called self-progressing robust training (SPROUT). These techniques introduce a general framework that formulates robust training objectives via vicinity risk minimization (VRM), which includes many robust training methods as special cases. One or more embodiments feature self-adjusted label distribution (e.g., parameterized label smoothing) during training, instead of attack generation (e.g., as is used in typical adversarial training).

Further, one or more embodiments can supplement proposed parametrized label smoothing techniques with Gaussian augmentation and mixup, to further enhance robustness. SPROUT techniques are described in more detail in the paper SPROUT: Self-Progressing Robust Training, provided along with this application (the "SPROUT Paper"). The SPROUT Paper is herein incorporated by reference, for its disclosure of SPROUT techniques.

In contrast to adversarial training, SPROUT alleviates the need for attack generation, making its training much more scalable than existing adversarial training techniques while attaining better or comparable robustness performance. Further, SPROUT techniques can be applied both to new, randomly initialized, machine learning models, and to at-least partially pre-trained models. These techniques can significantly improve existing, pre-trained models.

Figure 1A:
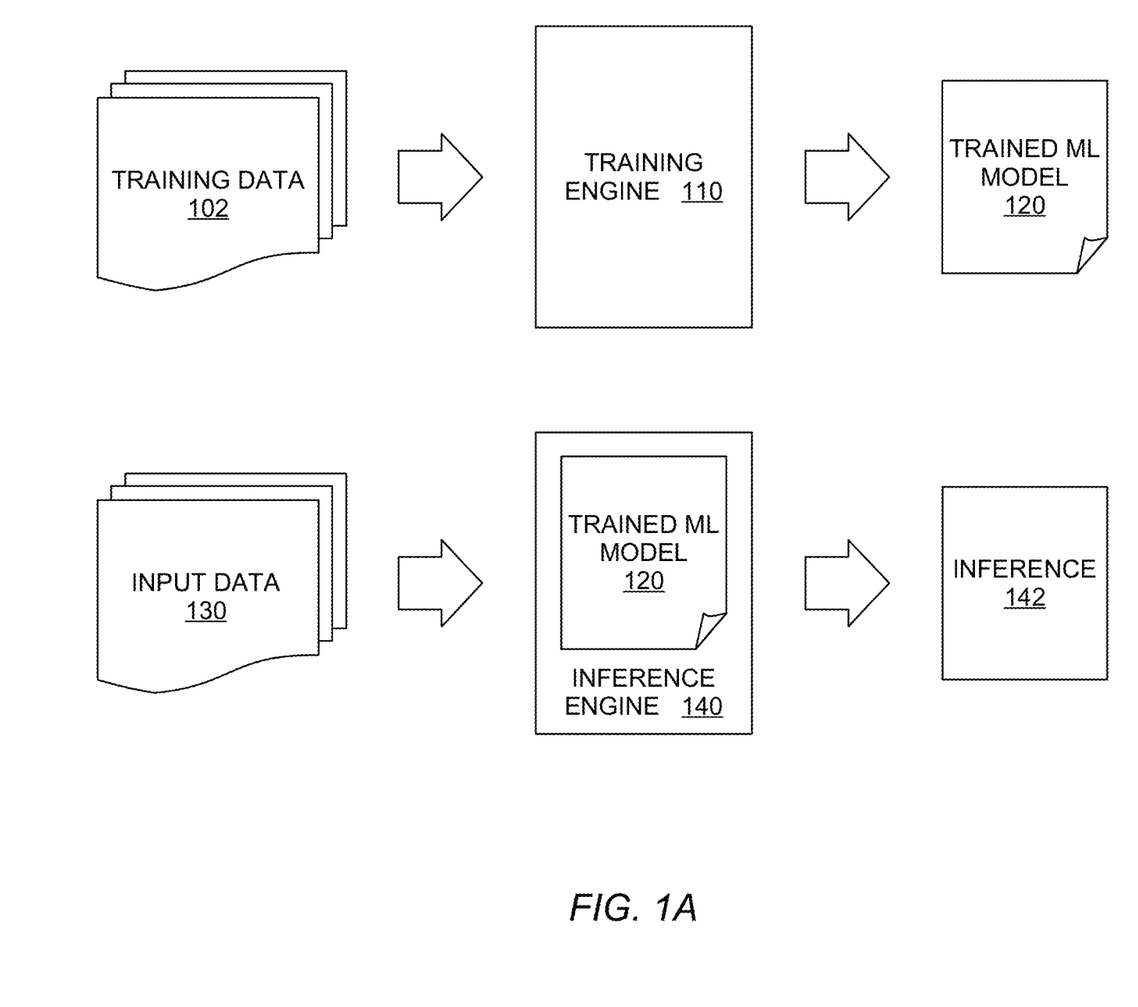
FIGS. 1A-C illustrate training robust machine learning models for adversarial input data, according to at least one embodiment.
Figure 1B:
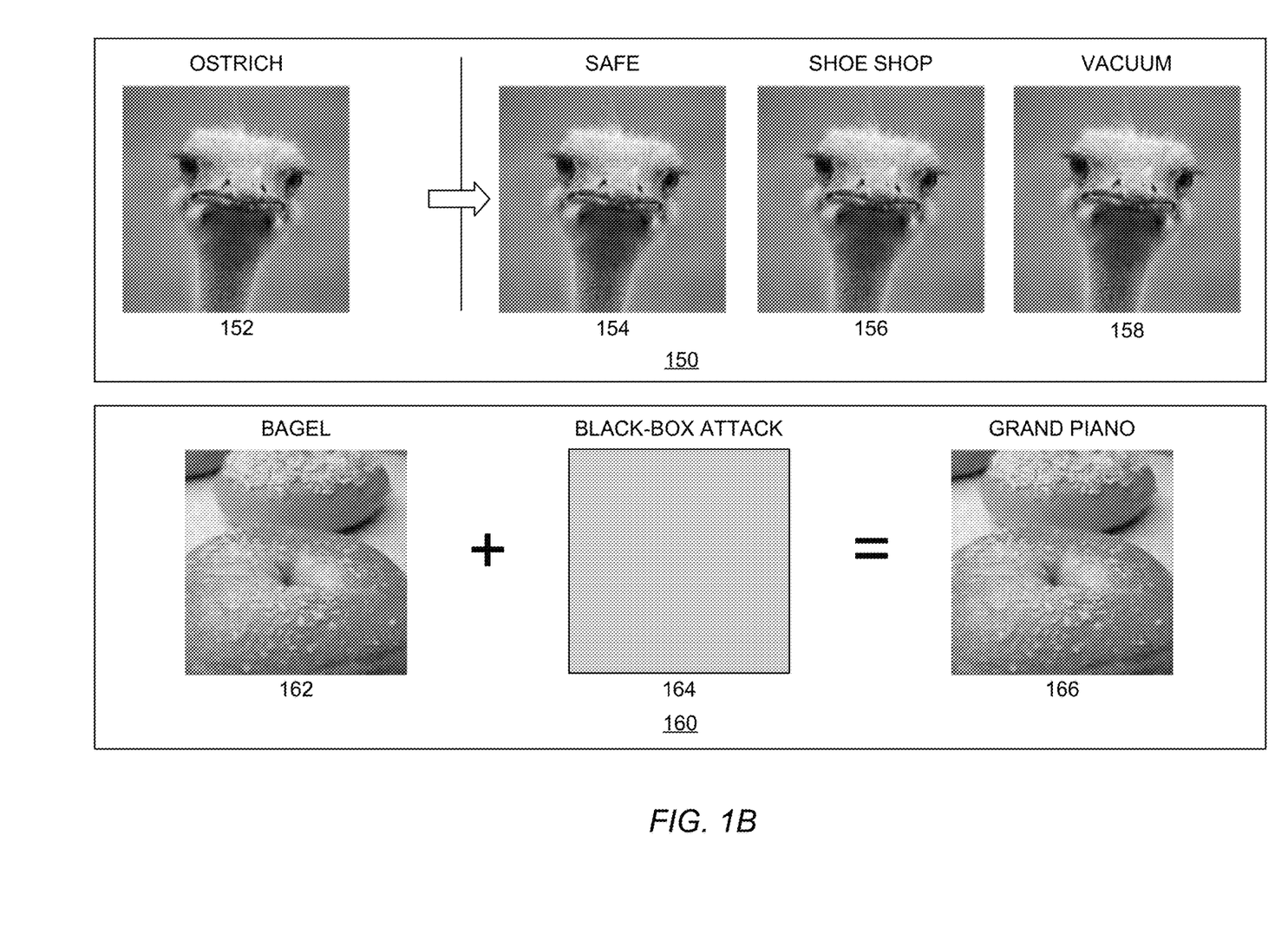
Figure 1C:
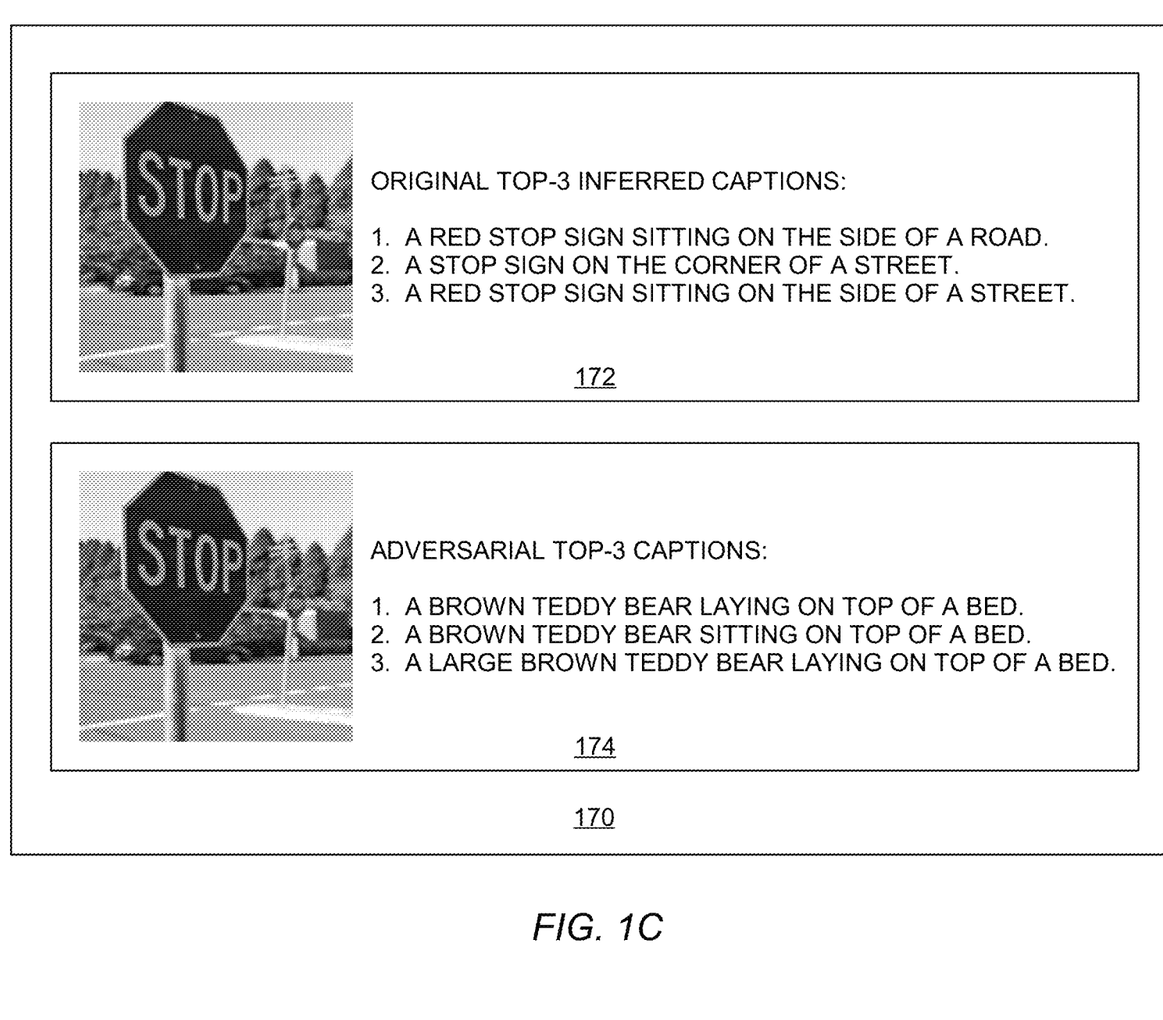

FIGS. 1A-C illustrates training robust machine learning models for adversarial input data, according to at least one embodiment. FIG. 1A illustrates training a machine learning model, according to at least one embodiment. Training data 102 is provided to a training engine 110. The training engine 110 uses the training data 102 to generate a trained machine learning (ML) model 120. In an embodiment, the training engine 110 can include an ML training module (e.g., as discussed below with regard to FIG. 2) that utilizes, for example, exemplars and pre-determined attribute scores to train the ML model 120. For example, a corpus of training data 102 can be converted into feature vectors. These feature vectors can be provided to a model training component in the training engine 110, along with a set of associated attribute values. That is, the training data 102 can include one or more associated attribute values for the principle attributes used by the system. Each of the one or more attribute values can represent a measure of an attribute indicated by the corresponding training data.

The training engine 110 can use supervised machine learning techniques to generate and update a trained ML model 120, which can then be used to process new data. For example, input data 130 can be provided to an inference engine 140, which includes the trained ML model 120. The inference engine can generate one or more inferences 142, using the input data 130 and the trained ML model 120.

FIGS. 1B-C illustrate adversarial input data relating to image recognition, according to at least one embodiment. In some circumstances, input data provided to a trained ML model can be intentionally manipulated to create an inaccurate interference from the trained ML model. The data may appear unchanged to the human eye, but can be specifically designed to generate an inaccurate inference. This can be done for many reasons, including malicious reasons, testing, etc.

For example, FIG. 1B illustrates perturbations in input data. For example, the data 150 includes four images of an ostrich. In an embodiment, an inference engine uses a trained ML model to recognize and label a still image. A first image, 152, is un-doctored. When the image 152 is provided to the trained ML model, the inference engine accurately labels image 152 as an ostrich.

The remaining images 154, 156, and 158, however, include small perturbations (e.g., modifications) intended to fool the trained ML model. In an embodiment, these images 154, 156, and 158 can appear to the human eye to match the image 152, but can include underlying perturbations sufficient to make the inference engine generate an inaccurate inference. For example, as illustrated, each of the images 154, 156, and 158 depict an ostrich and should be labeled "ostrich." But the image 154 is modified to generate the label "safe," the image 156 is modified to generate the label "shoe shop," and the image 158 is modified to generate the label "vacuum."

Similarly, the image 162 in the input data 160 depicts a bagel, and should be accurately labeled "bagel." But the inference engine is provided the image 164, which acts as a black box attack and decreases the accuracy of the trained ML model. This results in the inference engine inaccurately labelling the image 166 as a "grand piano," instead of a bagel.

As another example, FIG. 1C illustrates data 170 with both accurate and adversarial descriptive captions. In an embodiment, an inference engine uses a trained ML model to generate captions describing an image. The data 172 includes an un-doctored image, for which the inference engine generates three accurate descriptive captions. The data 174 includes an image with intentional perturbations designed to generate an inaccurate inference. The inference engine uses the trained ML model to generate captions for the image, but these captions are inaccurate because of the modifications to the image.

In existing systems, inference by ML models when faced with this modified input data can be improved by adversarial training. In an embodiment, this involves training the model using the modified input data on which the ML model will be tested. But as discussed above, this provides very poor scalability (e.g., because training data corresponding to a large number of potential adversarial attacks must be generated) and can result in a model that does not generalize well to other adversarial attached (e.g., other than the attacks on which the ML model was trained). As discussed below, robust training methods (e.g., one or more aspects of SPROUT training methods) can be used to generate a robust trained ML model and improve this significantly. In an embodiment, when faced with the modified image in the input data 174, or the modified images 154, 156, 158 and 164 illustrated in FIG. 1B, the robust trained ML model is much more likely to generate accurate caption(s) or label(s). Image recognition is merely one example of a suitable inference task for an ML model, and any suitable ML model can be used.

Figure 2:
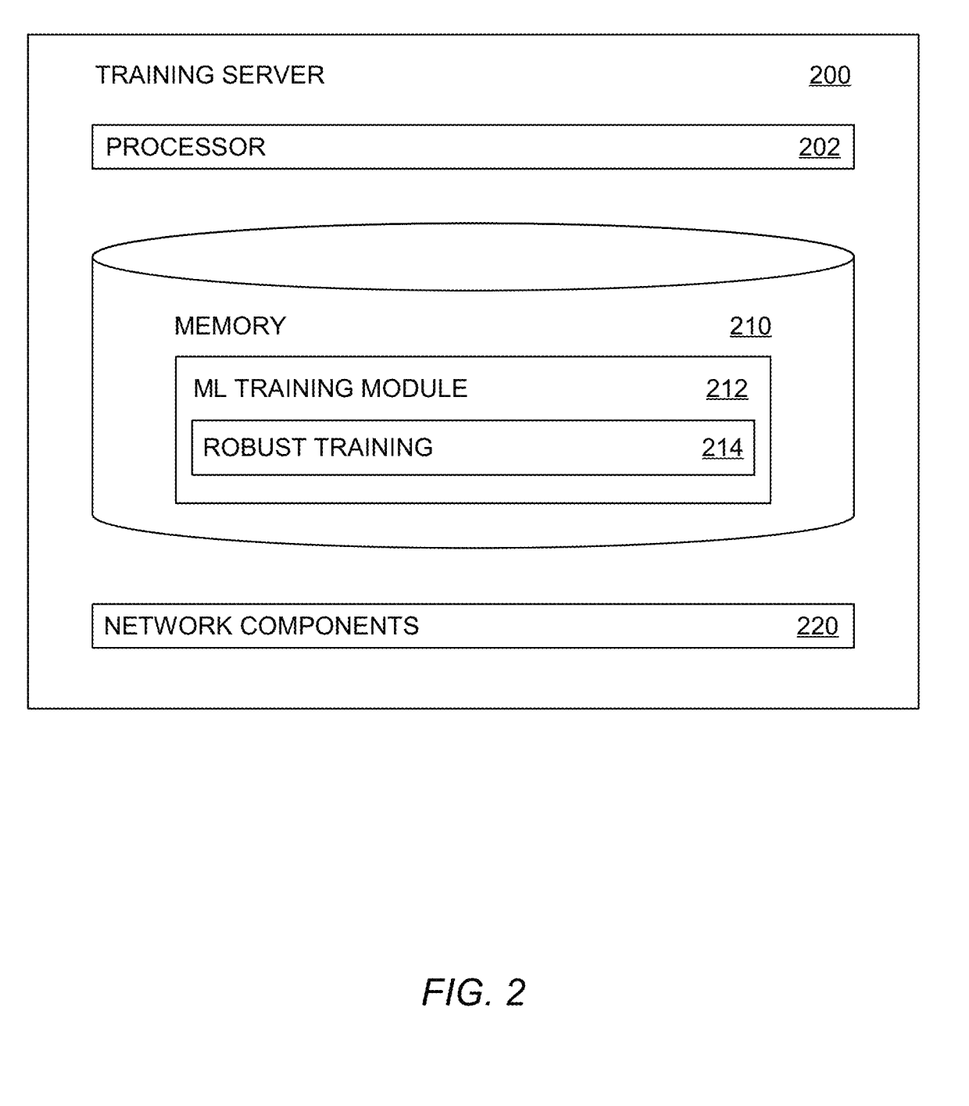
FIG. 2 is a block diagram illustrating a training server for training robust machine learning models for adversarial input data, according to at least one embodiment.

FIG. 2 is a block diagram illustrating a training server 200 (e.g., running the training engine 110 illustrated in FIG. 1) for training robust machine learning models for adversarial input data, according to at least one embodiment. The training server 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the training server 200 to interface with a network system, for example a cloud or network based storage system for the training data (e.g., the training data 102 illustrated in FIG. 1A). This can be any suitable network, including a local area network (LAN) (e.g., an enterprise network), a wide area network (WAN), or the Internet. For example, the network components 220 can include wired, WiFi or cellular network interface components and associated software to facilitate communication between the training server 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the training server 200. The program code is generally described as various functional "applications" or "modules" within the memory 210, although alternate implementations may have different functions and/or combinations of functions.

Within the memory 210, an ML training module 212 facilitates training a supervised ML model using training data. The ML training module 212 further includes a robust training module 214 that facilitates robust training of an ML model for adversarial input data (e.g., using one or more SPROUT techniques). This is discussed in further detail in subsequent figures.

Figure 3:
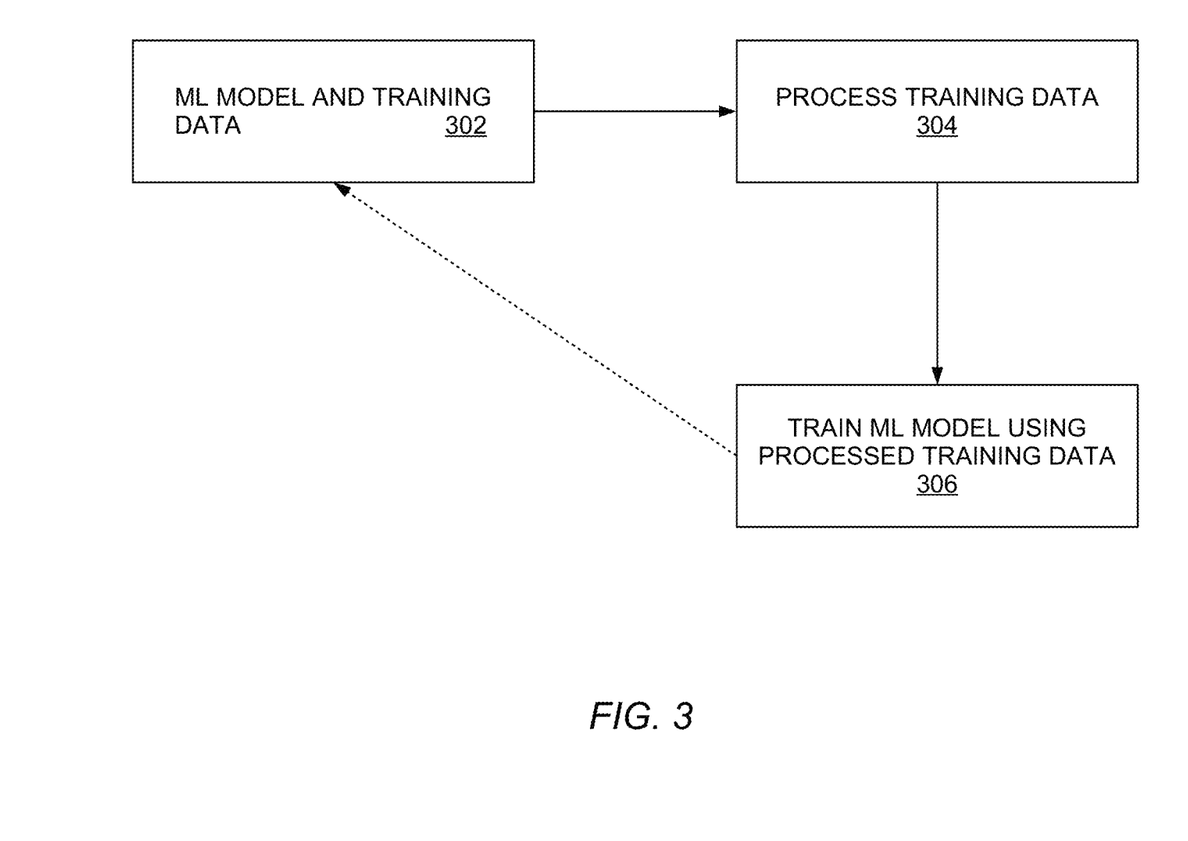
FIG. 3 is a flowchart for training robust machine learning models for adversarial input data, according to at least one embodiment.

FIG. 3 is a flowchart 300 for training robust machine learning models for adversarial input data, according to at least one embodiment. At block 302, a robust training module (e.g., the robust training module 214 illustrated in FIG. 2) receives an ML model and training data. In an embodiment, the ML model is an untrained model (e.g., randomly initialized) that is ready for training using the training data. Alternatively, the ML model has been trained using the training data, or using alternative (or additional) training data. As discussed above, in an embodiment the robust training module can be used both to train an untrained ML model and to improve training on a previously trained ML model.

At block 304, the robust training module processes the training data. For example, the robust training module can process the data using any (or all) of parameterized label smoothing, Gaussian augmentation, and mixup. In an embodiment, this allows for more robust training of the ML model. This is discussed in more detail with regard to FIG. 4, below.

At block 306, the robust training module trains the ML model using the processed training data. For example, the robust training module can use the training data after the parameterized label smoothing, Gaussian augmentation, and mixup performed at block 304. This provides more robust training of the ML model. Block 306 is discussed in more detail with regard to FIG. 5, below.

After block 306, the flow returns to block 302. In an embodiment, the robust training module can iteratively repeat blocks 302-306 to continuously improve training. For example, as discussed in more detail below with regard to FIG. 5, the robust training module can iteratively update the parameters used for parameterized label smoothing, with each training cycle.

Figure 4:
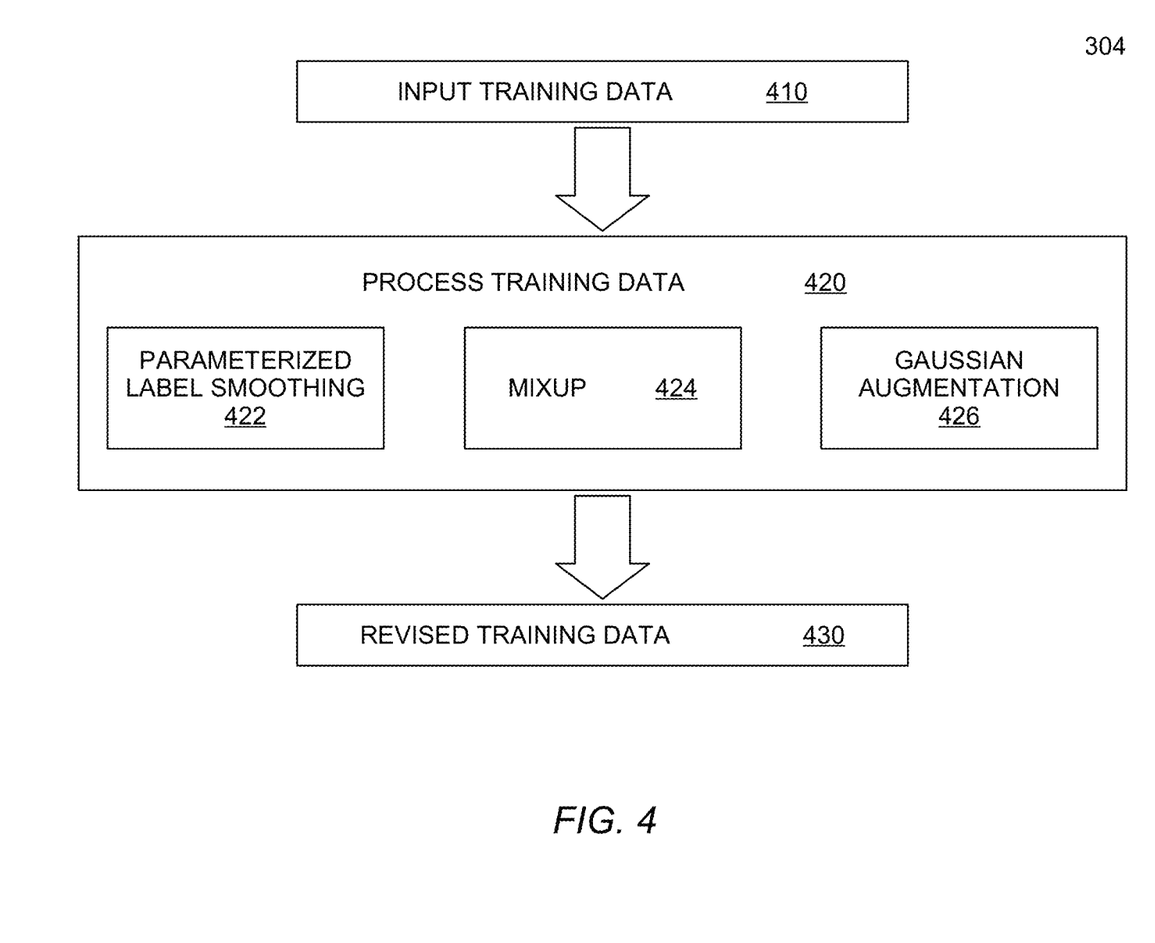
FIG. 4 is a flowchart for processing training data as part of training robust machine learning models for adversarial input data, according to at least one embodiment.

FIG. 4 is a flowchart for processing training data as part of training robust machine learning models for adversarial input data, according to at least one embodiment. In an embodiment, FIG. 4 corresponds with block 304 in FIG. 3, discussed above. Input training data 410 is provide to block 420.

At block 420, a robust training module (e.g., the robust training module 214 illustrated in FIG. 2) processes the input training data and generates revised training data 430. In an embodiment, the robust training module processes the training data using all of parameterized label smoothing, at block 422, mixup, at block 424, and Gaussian augmentation, at block 426. Each of these will be discussed below. Alternatively, the robust training module can process the input training data using any combination of these three techniques. For example, the robust training module can use only parameterized label smoothing, or parameterized label smoothing in combination with either mixup or Gaussian augmentation. This is discussed further with regard to FIG. 6, below.

At block 422, the robust training module performs parameterized label smoothing on the input training data. In an embodiment, traditional label smoothing can stabilize model training by replacing one-hot encoded labels with assigning non-zero (e.g., uniform) weights to every label other than the original training label. The robust training module can improve this by using parameterized label smoothing, in which, in an embodiment, a static (e.g., pre-defined) label smoothing function is replaced with adaptive sampling of training labels from a parameterized distribution on the label simplex. The parameters of the label distribution are progressively adjusted according to the updates of model weights.

As one example, the robust training module can perform Dirichlet label smoothing, which performs parameterized label smoothing based on a parameterized Dirichlet distribution. For example, assume the training data includes pairs (x, y), in which x represents a given piece of data (e.g., an image for an image recognition ML model) and y represents a label. Dirichlet label smoothing can modify the label y to generate modified label $\tilde{y}$ using the equation below:

$$\tilde{y} = \mathrm{Dirichlet}((1-\alpha)y + \alpha\beta)$$

In this equation Dirichlet( ) represents a parameterized Dirichlet distribution, y is the input label, $\alpha \in [0,1]$ is the smoothing parameter and $\beta$ is an optimization parameter optimized throughout training.

Further, in an embodiment, the optimization parameter $\beta$ can be updated to find a training label distribution that is most uncertain for a given model $\theta$ by solving the equation:

$$\max_{\beta} L(\tilde{x}, \tilde{y}, \beta; \theta)$$

In this equation $\tilde{x}$ represents modified data element x, $\tilde{y}$ represents the modified label, $\beta$ represents the parameter and $\theta$ represents the ML model. A Dirichlet distribution is merely one example, and other suitable parameterized label smoothing techniques and distributions can be used. Further details regarding parameterized label smoothing are discussed in the Sprout Paper (e.g., at Section 3.1) which, as discussed above, is incorporated herein by reference.

Further, in an embodiment, one or more of the parameters used in the parameterized label smoothing (e.g., the optimization parameter $\beta$) can be used to identify commonalities among training data. For example, the optimization parameter $\beta$ can be examined after training is completed and can be used to interpret or describe similarities and differences in the training data (e.g., similar parameters suggest similarities in the data). This could be useful for numerous applications, including further improving the training data.

At block 424, the robust training module performs mixup on the input training data. In an embodiment, mixup involves convex combination on pairs of training data samples x (e.g., in a mini-batch) and their labels y during training. For example, the vicinity function for mixup can be:

$$v(\tilde{x}, \tilde{y} | x_i, y_i) = \delta(\tilde{x} = (1-\lambda)x_i + \lambda x_j, \tilde{y} = (1-\lambda)y_i + \lambda y_j)$$

Where λ~Beta(a,a) is the mixing parameter drawn from the Beta distribution and a>0 is the shape parameter. Further details regarding mixup are discussed in the Sprout Paper (e.g., at Section 3.2) which, as discussed above, is incorporated herein by reference.

At block 426, the robust training module performs Gaussian augmentation on the input training data. Adding Gaussian noise to data samples during training can improve model robustness. For example, the corresponding vicinal function can be the Gaussian vicinity function:

$$v(\tilde{x},\tilde{y}|x_i,y_i) = \aleph(x_i,\Delta^2)\delta(\tilde{y}_i = y_i)$$

Where $\Delta^2$ is the variance of a standard normal random vector.

Further, in an embodiment, Gaussian augmentation can be combined with parameterized label smoothing (e.g., Dirichlet label smoothing as discussed in relation to block 422) to create a joint vicinity function:

$$v(\tilde{x},\tilde{y}|x_i,y_i,\beta) = \aleph(x_i,\Delta^2)\delta(\tilde{y}_i = \text{Dirichlet}((1-\alpha)y_i + \alpha\beta))$$

Further details regarding Gaussian augmentation are discussed in the Sprout Paper (e.g., at Section 3.2) which, as discussed above, is incorporated herein by reference.

Figure 5:
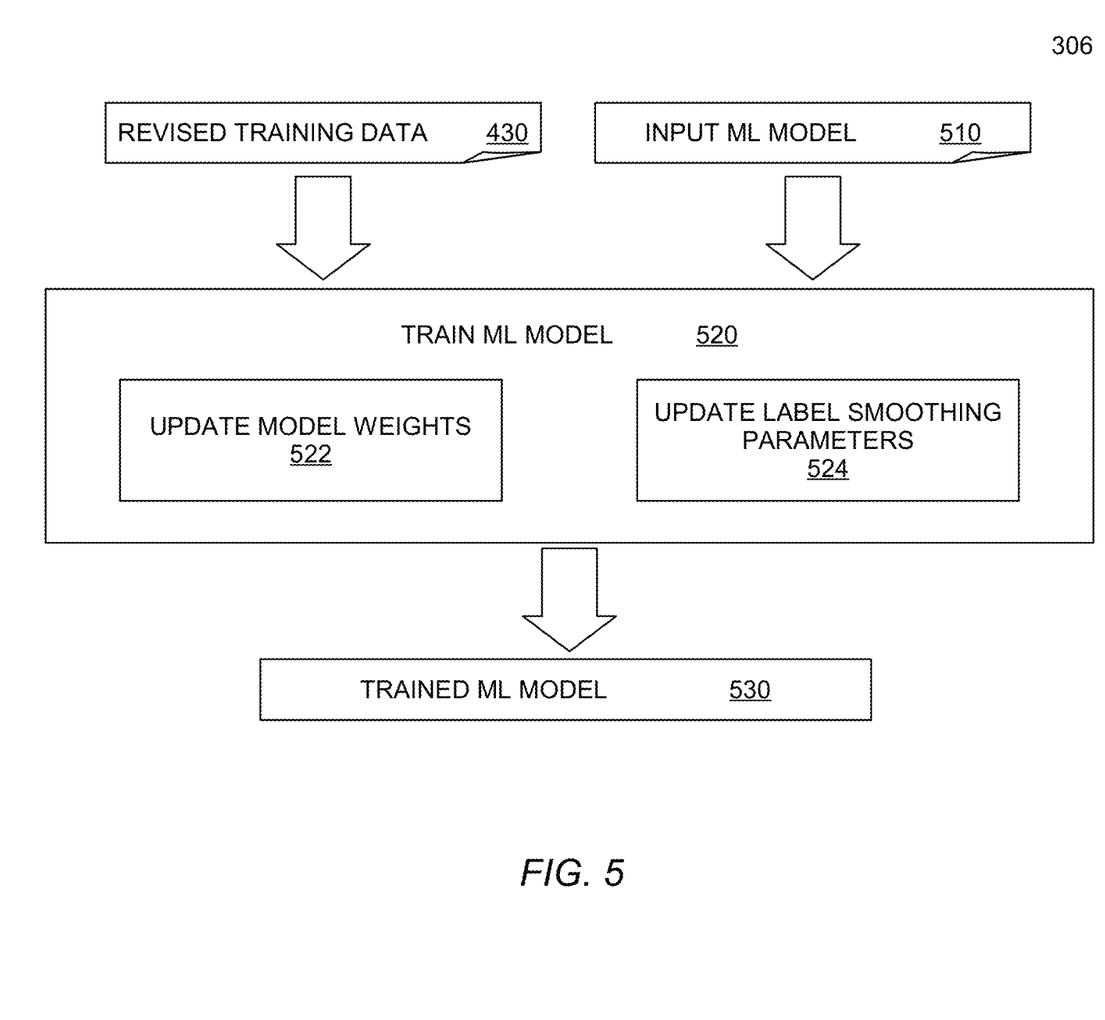
FIG. 5 is a flowchart for training a robust machine learning model, according to at least one embodiment.

FIG. 5 is a flowchart for training a robust machine learning model, according to at least one embodiment. In an embodiment, FIG. 5 corresponds with block 306 illustrated in FIG. 3. Revised training data 430 (e.g., the training data revised using one or more SPROUT techniques, as discussed above with regard to FIG. 4) and an input ML model are provided to block 520, which trains the input ML model 510 using the revised training data 430.

As discussed above, in an embodiment, the ML model is an untrained model (e.g., randomly initialized) that is ready for training using the training data. Alternatively, the ML model has been trained using the training data, or using alternative (or additional) training data. In an embodiment the robust training module can be used both to train an untrained ML model and to improve training on a previously trained ML model.

At block 520, a robust training module (e.g., the robust training module 214 illustrated in FIG. 2) trains the input ML model 510 to generate a trained ML model 530. At block 522 the robust training model updates the model weights in the input ML model 510 by training the model using the revised training data 430. In an embodiment, typical training algorithms can be used (e.g., depending on the ML model). Because the revised training data 430 has been revised using one or more SPROUT techniques as discussed above with regard to FIG. 4, the resulting trained model will be significantly more robust to adversarial input data.

At block 524, the robust training module updates the label smoothing parameters. As discussed above with regard to block 422, in an embodiment the robust training module uses parameterized label smoothing to modify the training data. The parameters used for this parameterized label smoothing can be updated repeatedly, for example in each training iteration. During the training process, the robust training module can update these parameters so that the next time parameterized label smoothing is used to modify the training data, the updated parameters are used. Further details regarding updating the parameters for parameterized label smoothing are discussed in the Sprout Paper (e.g., at Section 3) which, as discussed above, is incorporated herein by reference.

Figure 6:
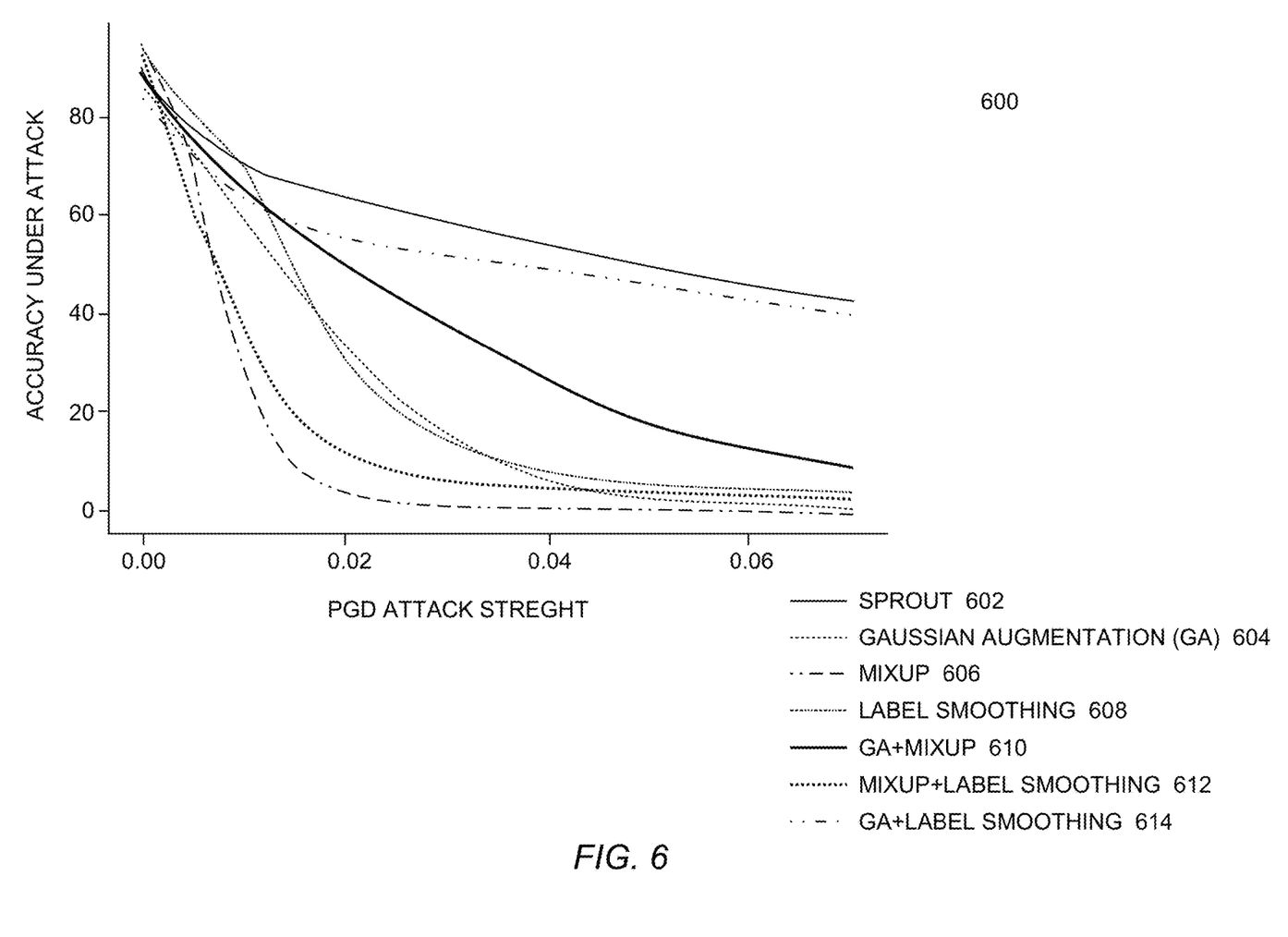
FIG. 6 illustrates improved accuracy for machine learning models trained using exemplary techniques, according to at least one embodiment.

FIG. 6 illustrates improved accuracy for machine learning models trained using exemplary techniques, according to at least one embodiment. In an embodiment, the three SPROUT techniques of parametrized label smoothing, Gaussian augmentation, and mixup are complementary. This means that the results when using all three techniques are greater than would be expected from simply applying each individually.

This is illustrated in FIG. 6, as discussed further below. In an embodiment, however, a robust training module (e.g., the robust training module 214 illustrated in FIG. 2) can use only some of the SPROUT techniques. For example, much of the improvement can be gained by using parameterized label smoothing, without Gaussian augmentation and mixup. This is merely one example, and any suitable combination of techniques can be used.

In the graph 600, the y-axis represents the accuracy of an exemplary trained ML model under attack, after the model has been trained using a given combination of techniques. The x-axis represents the projected gradient descent (PGD) attack strength. As illustrated, the line 602 represents using all three SPROUT techniques: parameterized label smoothing, Gaussian augmentation, and mixup. It shows the highest accuracy for most values of PGD attack strength.

The line 614 represents parameterized label smoothing in combination with Gaussian augmentation, and shows the next highest accuracy for most values of PGD attack strength. The line 610 represents Gaussian augmentation in combination with mixup, and shows the next highest accuracy for many values of PGD attack strength. The line 608 represents parameterized label smoothing alone, and shows the next highest accuracy for many values of PGD attack strength.

The line 604 represents Gaussian augmentation alone, and shows the next highest accuracy for most values of PGD attack strength. The line 612 represents mixup in combination with parameterized label smoothing, and shows the next highest accuracy for most values of PGD attack strength. Finally, the line 606 represents mixup alone, and shows the lowest accuracy for most values of PGD attack strength.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., ML training module 212 or robust training module 214 illustrated in FIG. 2) or related data available in the cloud. For example, the robust training module 214 could execute on a computing system in the cloud and perform robust training of an ML model. In such a case, the robust training model could access and store training data and the ML model at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving training data for a machine learning (ML) model, the training data comprising a plurality of labels for data elements;
generating first modified training data by modifying one or more of the plurality of labels in the training data using parameterized label smoothing with a first optimization parameter; and
training the ML model using the first modified training data, the training comprising:
updating a first one or more model weights in the ML model; and
generating a second optimization parameter, the second optimization parameter suitable for use in future parameterized label smoothing for future training of the ML model.

2. The method of claim 1, further comprising:
generating second modified training data by modifying one or more labels in the first modified training data using parameterized label smoothing with the second optimization parameter; and
further training the ML model using the second modified training data, the further training comprising:
updating a second one or more model weights in the ML model; and
generating a third optimization parameter, the third optimization parameter suitable for use in future parameterized label smoothing for future training of the ML model.

3. The method of claim 2, wherein the parameterized label smoothing comprises Dirichlet label smoothing using a Dirichlet distribution.

4. The method of claim 3, wherein the parameterized label smoothing follows an equation $\tilde{y}$=Dirichlet $((1-\alpha)y+\alpha\beta)$, where y comprises a label in the training data prior to modification, $\tilde{y}$ comprises the label modified, $\alpha$ comprises a smoothing parameter, and $\beta$ comprises an optimization parameter.

5. The method of claim 2,
wherein the generating the first modified training data further comprises performing mixup and Gaussian augmentation, and
wherein the generating the second modified training data further comprises performing mixup and Gaussian augmentation.

6. The method of claim 1, wherein the generating the first modified training data further comprises performing mixup.

7. The method of claim 1, wherein the generating the first modified training data further comprises performing Gaussian augmentation.

8. The method of claim 1, wherein the generating the first modified training data further comprises performing both mixup and Gaussian augmentation.

9. The method of claim 1, wherein prior to the training using the first modified training data the ML model has been previously trained using the training data.

10. The method of claim 9, wherein after the training the ML model using the first modified training data, the ML model is more robust to adversarial input data than prior to the training using the first modified training data.

11. The method of claim 1, wherein prior to the training using the first modified training data the ML model is untrained.

12. A system, comprising:
a processor; and
a memory storing a program, which, when executed on the processor, performs an operation, the operation comprising:
receiving training data for a machine learning (ML) model, the training data comprising a plurality of labels for data elements;
generating first modified training data by modifying one or more of the plurality of labels in the training data using parameterized label smoothing with a first optimization parameter; and
training the ML model using the first modified training data, the training comprising:
updating a first one or more model weights in the ML model; and
generating a second optimization parameter, the second optimization parameter suitable for use in future parameterized label smoothing for future training of the ML model.

13. The system of claim 12, the operation further comprising:
generating second modified training data by modifying one or more labels in the first modified training data using parameterized label smoothing with the second optimization parameter; and
further training the ML model using the second modified training data, the further training comprising:

updating a second one or more model weights in the ML model; and generating a third optimization parameter, the third optimization parameter suitable for use in future parameterized label smoothing for future training of the ML model.

14. The system of claim 13, wherein the parameterized label smoothing comprises Dirichlet label smoothing using a Dirichlet distribution.

15. The system of claim 13,
wherein the generating the first modified training data further comprises performing mixup and Gaussian augmentation, and
wherein the generating the second modified training data further comprises performing mixup and Gaussian augmentation.

16. The system of claim 12, wherein the generating the first modified training data further comprises performing both mixup and Gaussian augmentation.

17. A non-transitory computer program product, the computer program product comprising:
a computer-readable storage medium having computer-readable program code embodied therewith, the computer-readable program code executable by one or more computer processors to perform an operation, the operation comprising:
receiving training data for a machine learning (ML) model, the training data comprising a plurality of labels for data elements;
generating first modified training data by modifying one or more of the plurality of labels in the training data using parameterized label smoothing with a first optimization parameter; and
training the ML model using the first modified training data, the training comprising:
updating a first one or more model weights in the ML model; and
generating a second optimization parameter, the second optimization parameter suitable for use in future parameterized label smoothing for future training of the ML model.

18. The computer program product of claim 17, the operation further comprising:
generating second modified training data by modifying one or more labels in the first modified training data using parameterized label smoothing with the second optimization parameter; and
further training the ML model using the second modified training data, the further training comprising:
updating a second one or more model weights in the ML model; and
generating a third optimization parameter, the third optimization parameter suitable for use in future parameterized label smoothing for future training of the ML model.

19. The computer program product of claim 18, wherein the parameterized label smoothing comprises Dirichlet label smoothing using a Dirichlet distribution.

20. The computer program product of claim 17, wherein the generating the first modified training data further comprises performing both mixup and Gaussian augmentation.

* * * * *